United States Patent [19]

Levinson

[11] Patent Number: 4,626,066
[45] Date of Patent: Dec. 2, 1986

[54] OPTICAL COUPLING DEVICE UTILIZING A MIRROR AND CANTILEVERED ARM

[75] Inventor: Frank H. Levinson, Hanover Township, Morris County, N.J.

[73] Assignee: AT&T Bell Laboratories, Murray Hill, N.J.

[21] Appl. No.: 567,430

[22] Filed: Dec. 30, 1983

[51] Int. Cl.⁴ .............................. G02B 6/32
[52] U.S. Cl. .................. 350/96.18; 350/96.20; 370/3
[58] Field of Search .............. 350/96.15, 96.16, 96.19, 350/96.20; 370/1, 3; 372/102, 20, 93, 97

[56] References Cited

U.S. PATENT DOCUMENTS

| | | | |
|---|---|---|---|
| 3,624,551 | 11/1971 | Gudmundsen | 372/20 |
| 4,111,524 | 5/1978 | Tomlinson, III | 350/96.19 |
| 4,152,043 | 5/1979 | Albanese | 350/96.20 |
| 4,287,486 | 9/1981 | Javan | 372/20 |
| 4,303,302 | 12/1981 | Ramsey et al. | 350/96.20 |
| 4,304,460 | 12/1981 | Tanaka et al. | 350/96.16 |
| 4,484,793 | 11/1984 | Laude | 350/96.15 X |

OTHER PUBLICATIONS

*Applied Physics Letters*, vol. 31, No. 3, Aug. 1, 1977, pp. 169–171, Tomlinson, W. J. et al., "Optical Multiplexer for Multimode Fiber Transmission Systems".

"Silicon Micromechanical Devices", *Scientific American*, J. B. Angell et al., Apr. 1983, pp. 44–55.

Primary Examiner—William L. Sikes
Assistant Examiner—L. Rushin
Attorney, Agent, or Firm—Lester H. Birnbaum

[57] ABSTRACT

An optical coupling device for diverting light among different transmission elements. The device includes at least one graded-index-of-refraction lens with transmission elements coupled to one surface. At the opposite surface of the lens is a reflecting element which is adapted for movement so as to vary the angle of reflection of the incoming light from one of the transmission elements.

7 Claims, 8 Drawing Figures

OPTICAL COUPLING DEVICE UTILIZING A MIRROR AND CANTILEVERED ARM

BACKGROUND OF THE INVENTION

This invention relates to optical communications systems, and in particular to a device for diverting light among various optical transmission elements.

In optical communications systems, the need exists for a variety of coupling devices where light can be switched among various transmission elements. For example, 1×2 and nonblocking 2×2 switches will be used in a variety of applications. In ring networks, for example, an asymmetric four-port coupler could be utilized. (See, for example, U.S. patent application of F. H. Levinson, Ser. No. 396,118, filed July 7, 1982 and assigned to the present assignee now U.S. Pat. No. 4,486,071, which is incorporated by reference herein.) It would be desirable if such couplers had a sparing feature so that a particular terminal in the network could be easily decoupled therefrom in the event of a malfunction in that station. Another type of coupler could find use in optical systems where a multiplexed signal is transmitted among many subscribers (e.g., Cable TV). Such a coupler would perform the function of a tunable demultiplexer to permit the subscriber to choose among the various transmitted wavelengths. In general, regardless of the particular function, it is desirable for the coupler to be as compact and as inexpensive as possible.

At least one proposal has been made for a multiport coupler using a graded-index-of-refraction lens. (See U.S. Pat. No. 4,304,460 issued to Tanaka et al.) There, an array of fibers is coupled to one surface of the lens and a rotatably mounted mirror positioned at an angle to the lens is provided at the other surface. Incoming light from one fiber is diverted to another selected fiber by a proper rotation of the mirror. A filter element can be provided between the lens and mirror and also rotated to perform multiplexing. Further, it is suggested that the angle of the mirror to the lens surface can be varied by piezoelectric driving means. While adequate, the need for a motor to rotate the element adds complexity and cost to the coupler and use of piezoelectric driving means is not considered to be optimum for alignment and low cost manufacture.

It has also been proposed to form a multiplexer/demultiplexer utilizing a graded-index-of-refraction lens and a diffraction grating at the surface of the lens opposite to the transmission elements. (See U.S. Pat. No. 4,111,524 issued to Tomlinson.) However, such a device does not provide a tunable feature.

It is an object of the invention to provide compact optical coupling devices which can divert light among various transmission elements in a controlled manner.

SUMMARY OF THE INVENTION

This and other objects are achieved in accordance with the invention which is an optical device for diverting incoming light among transmission elements. The device includes a graded-index-of-refraction lens having two opposite surfaces. At least two transmission elements are coupled to one surface of the lens. One transmission element is adapted to transmit incoming light and the other transmission element is adapted to receive at least a portion of the incoming light which is reflected back to the one surface. A reflecting element is provided at the other surface of the lens and is adapted to reflect the incoming light at a certain angle. The reflecting element is movably mounted so that the angle of reflection of the incoming light is controllably altered.

BRIEF DESCRIPTION OF THE DRAWING

These and other features of the invention are delineated in detail in the following description. In the drawing.

It will be appreciated that for purposes of illustration these Figures are not necessarily drawn to scale.

DETAILED DESCRIPTION

Figure 1:
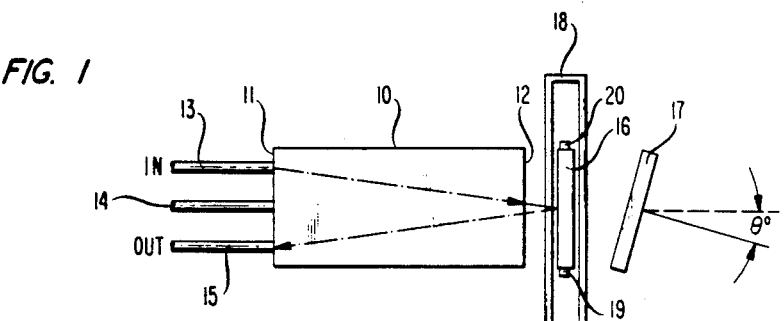
FIG. 1 is a partly schematic front view of a device in accordance with one embodiment of the invention.
Figure 2:
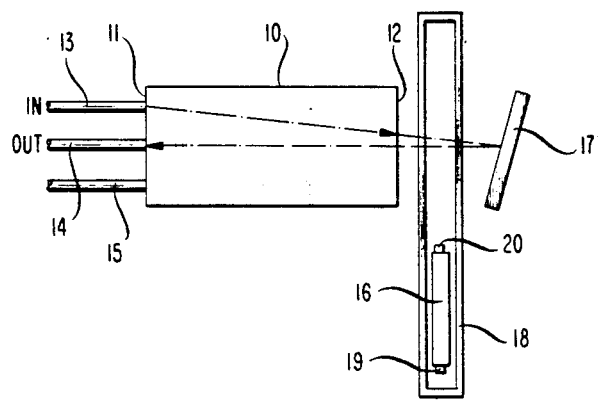
FIG. 2 is a partly schematic view of the same device of FIG. 1 at a different stage of operation.

FIGS. 1 and 2 illustrate a basic 1×2 optical switch which may be fabricated in accordance with the invention. This embodiment, and all subsequent embodiments, employ as a focusing element, 10, a standard, cylindrical, graded-index-of-refraction (Grin) lens with a ¼ pitch length. The lens includes two opposite surfaces, 11 and 12. Optically coupled to one surface, 11, is an array of three optical transmission elements 13–15, which in this and subsequent examples are standard optical fibers. Although shown in the same plane, it will be understood that the fibers are typically arranged in some array, such as triangular or square. It will be appreciated that the transmission elements could also be light-emitting devices or photodetectors where appropriate.

In close proximity to the opposite surface, 12, are two reflecting elements, 16 and 17. Element 16 is a mirror which is movably mounted essentially parallel to surface, 12, in a transparent enclosure, 18, which also includes a refractive-index-matching fluid. In this example, the mirror includes magnets, 19 and 20, at two ends so that the position of the mirror can be controlled by a magnetic field established by coils (not shown) around the enclosure, 18. In close proximity to mirror, 16, is the mirror, 17, which is tilted at a fixed angle with respect to the surface, 12, (i.e., in this example, the optical axis of mirror, 17, is at an angle, $\theta$, with respect to the normal to the surface, 12, and the optical axis of mirror, 16). The mirror, 17, may be mounted in this position by means of a transparent prism between it and the enclosure, 18, or by optical cement.

In operation, incoming light from fiber, 13, is incident on mirror, 16, and reflected back onto fiber, 15. The dashed lines and arrows illustrate schematically the general directions of the light beams, it being understood that for a ¼ pitch lens, light from surface, 11, will spread out to cover surface, 12, and then be refocused as it returns to surface, 11. When it is desired to switch the light from fiber, 15, to fiber, 14, mirror, 16, is moved out of the path of the incoming light as illustrated in FIG. 2. This can be accomplished by providing an appropriate magnetic field which attracts magnet, 19, and/or repels magnet, 20. The incoming light is then incident on mirror, 17, which is tilted at the appropriate angle so that the incoming light is now reflected onto fiber, 14. The device can later be switched back to its original position by a reversal of the magnetic field.

Figure 3:
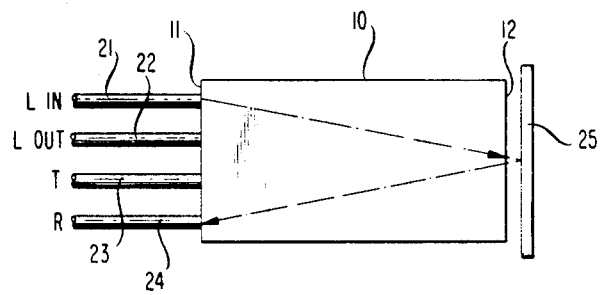
FIG. 3 is a partly schematic front view of a device in accordance with a further embodiment of the invention.
Figure 4:
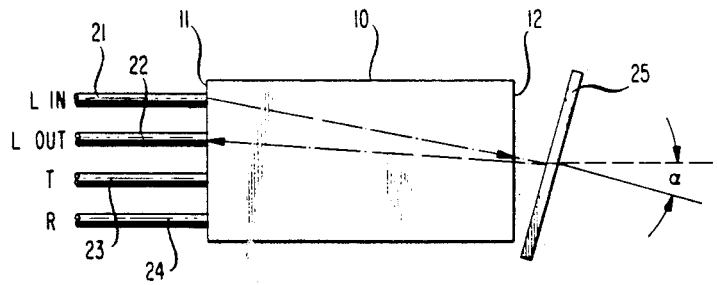
FIG. 4 is a partly schematic front view of the same device of FIG. 3 at a different stage of operation.

Another type of switch incorporating the principles of the invention is illustrated in FIGS. 3-4. Here, four fibers, 21-24, are coupled to surface, 11, of the Grin lens, 10, in an array such as to form an asymmetric four-port coupler. (For more details on such couplers, see, for example, U.S. patent application of F. H. Levinson, cited previously.) A reflective element, 25, is provided at surface, 12, essentially parallel thereto. During normal operation, light from incoming fiber, 21, (also designated $L_{in}$) is incident on mirror, 25, and reflected back onto fiber, 24, (also designated R). Although not illustrated for the sake of clarity, light from fiber, 23, (designated T) is also reflected by mirror, 25, onto fiber, 22, (also designated $L_{out}$). This type of coupler, therefore, can couple light between a common bus and one of a number of stations. However, at some point, the station may malfunction, at which time it is desirable to conveniently decouple it from the common bus. Thus, reflecting element, 25, is mounted so that it can be moved to a second position, as shown in FIG. 4. Here, the mirror, 25, is tilted at an angle such that light from fiber, 21, will be reflected back onto fiber, 22, and therefore bypass the station receiver coupled to fiber, 24. In this example, the tilt is illustrated as the angle, $\alpha$, which the optical axis of mirror, 25, makes with the normal to the surface, 12. (Although not shown, light from fiber, 23, coupled to the transmitter, will be deflected so that it will no longer be incident on fiber, 22). It will be appreciated that this same bypass switch could be fabricated utilizing the sliding mirror arrangement of FIGS. 1-2 with the appropriate array of fibers at surface, 11.

Figure 5:
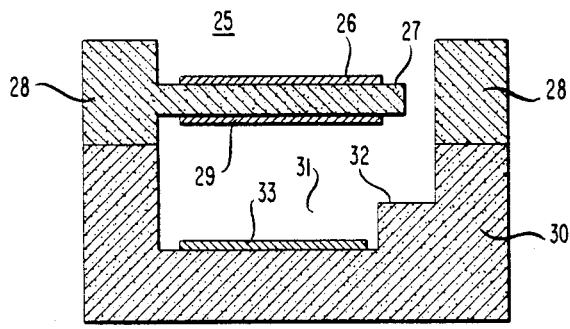
FIG. 5 is a partly schematic cross-sectional view of a portion of the device of FIGS. 3 and 4.
Figure 6:
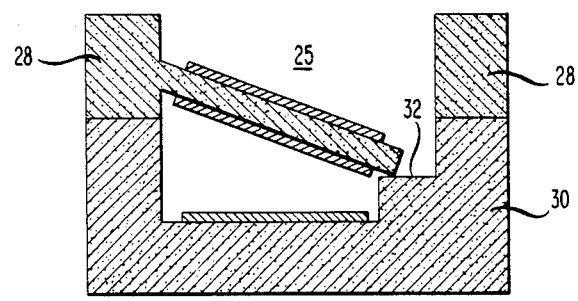
FIG. 6 is a partly schematic cross-sectional view of the portion of the device of FIG. 5 at a different stage of operation.

One means by which a tiltable mirror may be fabricated in accordance with the device of FIGS. 3-4 is shown in FIGS. 5-6. The reflecting element is shown rotated 90° from its normal operating position shown in FIGS. 3-4. The reflecting element, 25, is formed by depositing a layer of reflecting material, 26, such as gold over a cantilever portion, 27, which has been etched from a silicon substrate, 28. Such cantilever structures are used for other types of devices, such as accelerometers, and can be fabricated by standard micromachining techniques. (See, for example, Angell et al "Silicon Micromechanical Devices", *Scientific American*, pp. 44-45 (April, 1983).) A conductive layer, 29, which can also be gold, is formed on the underside of the cantilever portion. The substrate, 28, including the cantilever portion can be attached to another substrate, 30, which can also be silicon. The latter substrate has a well, 31, etched in the surface which includes a ledge, 32. At the bottom of the well is a conducting pad, 33, which can also be gold. The two substrates can be joined by a standard insulating adhesive.

During normal operation, the reflecting element is in the position shown in FIG. 5 (corresponding to the position in FIG. 3). When it is desired to switch the incoming light, a voltage may be applied to pads, 29 and 33, in order to create an electrostatic attraction which causes the cantilever to bend as illustrated in FIG. 6 (corresponding to the position of FIG. 4). The motion of the cantilever is stopped, and the angle of the tilt thereby fixed, by the ledge, 32. The cantilever can be returned to its original position by removing the voltage, or electrostatic repulsion can be established by providing like charge to pads, 29 and 33.

Figure 7:
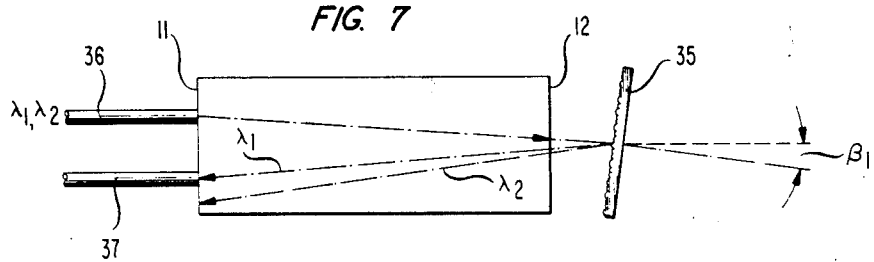
FIG. 7 is a partly schematic front view of a device in accordance with a further embodiment of the invention.
Figure 8:
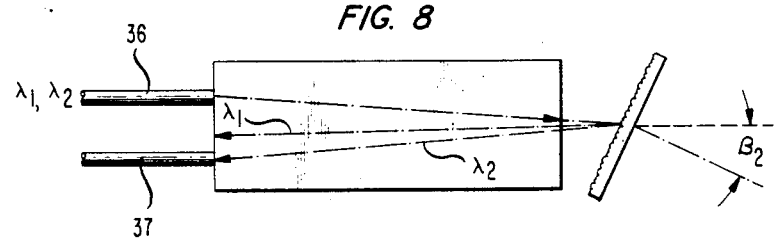
FIG. 8 is a partly schematic front view of the device of FIG. 7 at a different stage of operation.

As illustrated in FIGS. 7 and 8, the mirror of the previous embodiment (FIGS. 3 and 4) can be replaced by a diffraction grating, 35, in order to form a tunable demultiplexer. The device is illustrated with two fibers, 36 and 37, coupled to surface, 11, of the Grin lens, 10. The incoming light is provided by fiber, 36, and has at least two wavelength components, $\lambda_1$ and $\lambda_2$. In actual practice, the incoming light could have many more wavelength components. The device could also include many more fibers. The grating will reflect the different wavelength components at different angles. Fiber, 37, is positioned so that it will receive one wavelength component ($\lambda_1$) when the grating is in the position of FIG. 7 where the optical axis of the grating forms an angle $\beta_1$ with the normal to the lens surface. In FIG. 8, the grating is tilted at greater angle ($\beta_2$) so that the other wavelength component ($\lambda_2$) is now reflected onto fiber, 37. Thus, a device is provided which can select reception among a plurality of incoming wavelengths. If, for example, selection of more than two wavelengths is desired, the grating could be fabricated to have a different tilt for each wavelength component. In the device illustrated in FIGS. 7 and 8, the grating could be fabricated in accordance with FIGS. 5 and 6 by forming the grating in the cantilever portion, 27, by standard etching techniques. Alternatively, a grating could be mounted on the cantilever, 27.

Various additional modifications will become apparent to those skilled in the art. All such variations which basically rely on the teachings through which the invention has advanced the art are properly considered within the spirit and scope of the invention.

What is claimed is:

1. An optical device for diverting incoming light among transmission elements comprising:
   a graded-index-of-refraction lens including two opposite surfaces;
   at least two transmission elements coupled to one surface of the lens, one transmission element being positioned to transmit incoming light into said one surface and the other transmission element being positioned to receive at least a portion of the incoming light which is reflected back to said one surface;
   a first reflecting element at the other surface of the lens positioned to reflect the incoming light at a certain angle, the element being mounted so as to move in a direction parallel to the surface of the lens and out of the path of the incoming light; and
   a second reflecting element at an angle to the first reflecting element and positioned so that the incident light will be reflected by said second element when the first element is moved out of the path of the incoming light and the angle of reflection thereby altered.

2. The device according to claim 1 wherein the transmission elements comprise four optical fibers arranged so that the device acts as an asymmetric four-port coupler when the reflecting element reflects incoming light at said certain angle, and acts as a bypass device when the angle of reflection is altered by moving the reflecting element.

3. An optical device for diverting incoming light among transmission elements comprising:
- a graded-index-of-refraction lens including two opposite surfaces;
- at least two transmission elements coupled to one surface of the lens, one transmission element being positioned to transmit incoming light into said one surface and the other transmission element being positioned to receive at least a portion of the incoming light which is reflected back to said one surface; and
- a reflecting element at the other surface of the lens positioned to reflect the incoming light at a certain angle, the element comprising a cantilever beam formed from a semiconductor substrate so that bending of the beam controllably alters the said angle of reflection of the incoming light.

4. The device according to claim 3 wherein the refecting element further comprises means for bending the beam by electrostatic action.

5. The device according to claim 3 wherein the reflecting element is a diffraction rating etched into the cantilever beam.

6. The device according to claim 3 wherein the reflecting element is a diffraction grating mounted on the cantilever beam.

7. The device according to claim 3 wherein the means for bending the beam includes a ledge portion formed in another semiconductor substrate for stopping the motion of the beam and thereby fix the angle of reflection.

* * * * *